(12) United States Patent
Ashton

(10) Patent No.: US 6,367,225 B1
(45) Date of Patent: Apr. 9, 2002

(54) FILAMENT WOUND STRUCTURAL COLUMNS FOR LIGHT POLES

(75) Inventor: Clint Ashton, Gunnison, UT (US)

(73) Assignee: Wasatch Technologies Corporation, Gunnison, UT (US)

( * ) Notice: Subject to any disclaimer, the term of this patent is extended or adjusted under 35 U.S.C. 154(b) by 0 days.

(21) Appl. No.: 09/360,760

(22) Filed: Jul. 26, 1999

(51) Int. Cl.$^7$ ................................................ E04C 3/30
(52) U.S. Cl. .................. 52/736.1; 52/745.17; 52/DIG. 7
(58) Field of Search .................. 52/745.17, DIG. 7, 52/736.1, 736.3, 651.02

(56) References Cited

U.S. PATENT DOCUMENTS

| | | |
|---|---|---|
| 909,299 A | 1/1909 | Hilborn et al. |
| 997,435 A | 7/1911 | Bowman |
| 1,018,754 A | 2/1912 | Ford |
| 2,571,717 A | 10/1951 | Howald et al. |
| 2,870,793 A | 1/1959 | Bailey |
| 3,429,758 A | 2/1969 | Young |
| 3,562,403 A | 2/1971 | Monahan |
| 3,746,776 A | 7/1973 | Monahan |
| 3,929,543 A * | 12/1975 | Scott et al. .................. 156/169 |
| 3,987,593 A | 10/1976 | Svensson |
| 4,007,075 A * | 2/1977 | McClain et al. ............ 156/62.2 |
| 4,172,175 A * | 10/1979 | Pearson et al. .............. 428/376 |
| 4,246,732 A | 1/1981 | Farber |
| 4,312,162 A * | 1/1982 | Medney .................... 52/309.16 |
| 4,436,781 A | 3/1984 | Rother et al. |
| 5,218,810 A | 6/1993 | Isley, Jr. |
| 5,326,410 A * | 7/1994 | Boyles ......................... 156/71 |
| 5,492,579 A * | 2/1996 | Hosford et al. ................ 156/64 |
| 5,513,477 A | 5/1996 | Frehner |
| 5,555,696 A | 9/1996 | Morrison, III et al. |
| 5,680,739 A * | 10/1997 | Cercone et al. ............. 52/741.3 |
| 5,692,351 A * | 12/1997 | Morrison et al. ............. 52/301 |

\* cited by examiner

Primary Examiner—David M. Purol
(74) Attorney, Agent, or Firm—Clayton, Howarth & Cannon, P.C.

(57) ABSTRACT

A one-piece, unitary, elongate, tubular light pole. The elongate light pole defines a central axis and is constructed from a filament-wound composite of fiber-reinforced bonding agent and has a wall thickness of less than ¾ inch, and preferably ⅜ inch. The pole is configured and adapted to support a lighting structure, thereon without failure of the composite, such that a twenty-foot section of the pole is capable of withstanding a lateral load transverse of the axis of at least 300 pounds without failure of the composite.

20 Claims, 3 Drawing Sheets

FILAMENT WOUND STRUCTURAL COLUMNS FOR LIGHT POLES

BACKGROUND OF THE INVENTION

1. The Field of the Invention

The present invention relates generally to composite tubes, and more particularly, but not exclusively, to filament-wound, composite tubes having structural properties that satisfy certain standards of strength and durability for use as a street light pole.

2. Description of Related Art

Structural columns for supporting street lights, referred to herein as "light poles," must satisfy the standards put forth by the American National Standards Institute ("ANSI") in certain applications. One of these standards mandates that material used in the construction of light poles must pass the following test: a section of the pole material is cut to be twenty feet in length, is then cantilevered at one to extend outwardly in a horizontal direction as shown in FIGS. 3–4. A 300-pound load is then applied downwardly at the free end. The lateral (vertical) deflection at the free end responsive to the 300-pound load must not exceed 19.938 inches under current standards. These and other rigorous ANSI standards have heretofore necessitated that light poles often be made from structural steel.

Composite material is lighter and less expensive than structural steel, and attempts have been made to construct utility poles and light poles from composites. Unfortunately, such attempts have not been found to meet the ANSI standards. For example, U.S. Pat. No. 2,870,793 (granted Jan. 27, 1959 to Bailey), which discloses a composite utility line support member, admits to a breaking load of only 62 pounds (see col. 8, lines 72–74). U.S. Pat. No. 3,429,758 (granted Feb. 25, 1969 to Young) teaches a composite light pole utilizing a core material of rigid foam for providing structural reinforcement to the pole (see col. 2, lines 59–62, and FIG. 2a). U.S. Pat. No. 4,436,781 (granted Mar. 13, 1984 to Rother et al.) is directed to a simple street lamp having a support pole made of composite material and focuses on a better way to connect the lamp to the pole. None of these prior art patents, nor any other prior art information known to applicant, teaches or suggests a filament-wound pole capable of satisfying high-strength standards with structural aids or reinforcements.

BRIEF SUMMARY AND OBJECTS OF THE INVENTION

It is therefore an object of the present invention to provide a structural lighting pole made of filament-wound composite material.

It is a further object of the invention, in accordance with one aspect thereof, to provide a filament-wound tubular member having structural strength sufficient to satisfy standards currently put forth by the American National Standards Institute.

It is another object of the present invention, in accordance with one aspect thereof, to provide a filament-wound tubular member that can satisfy other strength parameters.

The above objects and others not specifically recited are realized in a specific illustrative embodiment of a one-piece, unitary, elongate, tubular light pole. The elongate light pole defines a central axis and is constructed from a filament-wound composite of fiber-reinforced bonding agent and has a wall thickness of less than ¾ inch, and preferably ⅜ inch. The pole is configured and adapted to support a lighting structure thereon without failure of the composite, such that a twenty-foot section of the pole is capable of withstanding a lateral load transverse of the axis of at least 300 pounds without failure of the composite.

Additional objects and advantages of the invention will be set forth in the description which follows, and in part will be apparent from the description, or may be learned by the practice of the invention without undue experimentation. The objects and advantages of the invention may be realized and obtained by means of the instruments and combinations particularly pointed out in the appended claims.

BRIEF DESCRIPTION OF THE DRAWINGS

The above and other objects, features and advantages of the invention will become apparent from a consideration of the subsequent detailed description presented in connection with the accompanying drawings in which.

DETAILED DESCRIPTION OF THE INVENTION

Figure 1:
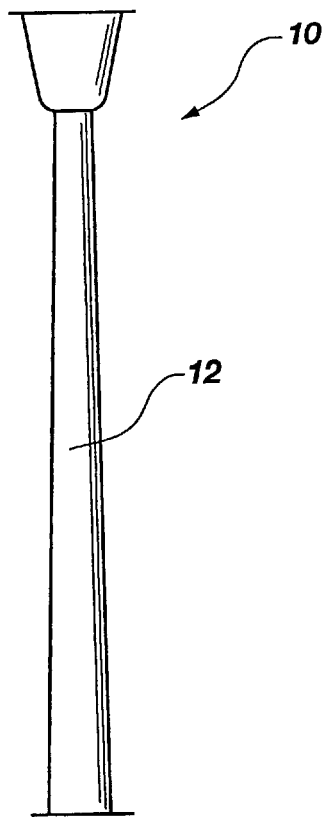
FIG. 1 is a side, elevational view of a street lamp made in accordance with the principles of the present invention.

For the purposes of promoting an understanding of the principles in accordance with the invention, reference will now be made to the embodiments illustrated in the drawings and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would normally occur to one skilled in the relevant art and having possession of this disclosure, are to be considered within the scope of the invention claimed.

Applicant has discovered that street light poles can be constructed from filament-wound composite material that still exhibit the structural strength necessary to satisfy strength standards put forth by the American National Standards Institute ("ANSI").

Applicant's street light pole satisfies these standards, in part, because of the size and dimension of the pole, and also because that pole is tubular in shape with a preferably constant external taper to the outer surface. Another of the reasons the structural strength of the pole is so high is that the tension in the tow thread during the filament-winding process of constructing the pole is maintained within a range of preferably 30–100 pounds as a bundle (the tow thread preferably comprising a bundle of preferably twelve tow strands), and more preferably at least 50 pounds as a bundle, which increases the strength and durability of the pole. Other reasons for the pole's strength include the multi-layered construction of the pole, with different winding patterns in the internal layer or layers. The cross-sectional pattern of the pole includes an inner circumferential layer followed by a series of internal, low angle or axial angle helical layers followed by an external circumferential layer (explained below in more detail). The internal and external circumferential layers contain the low angle helical layer which creates the stiffness.

Figure 2:
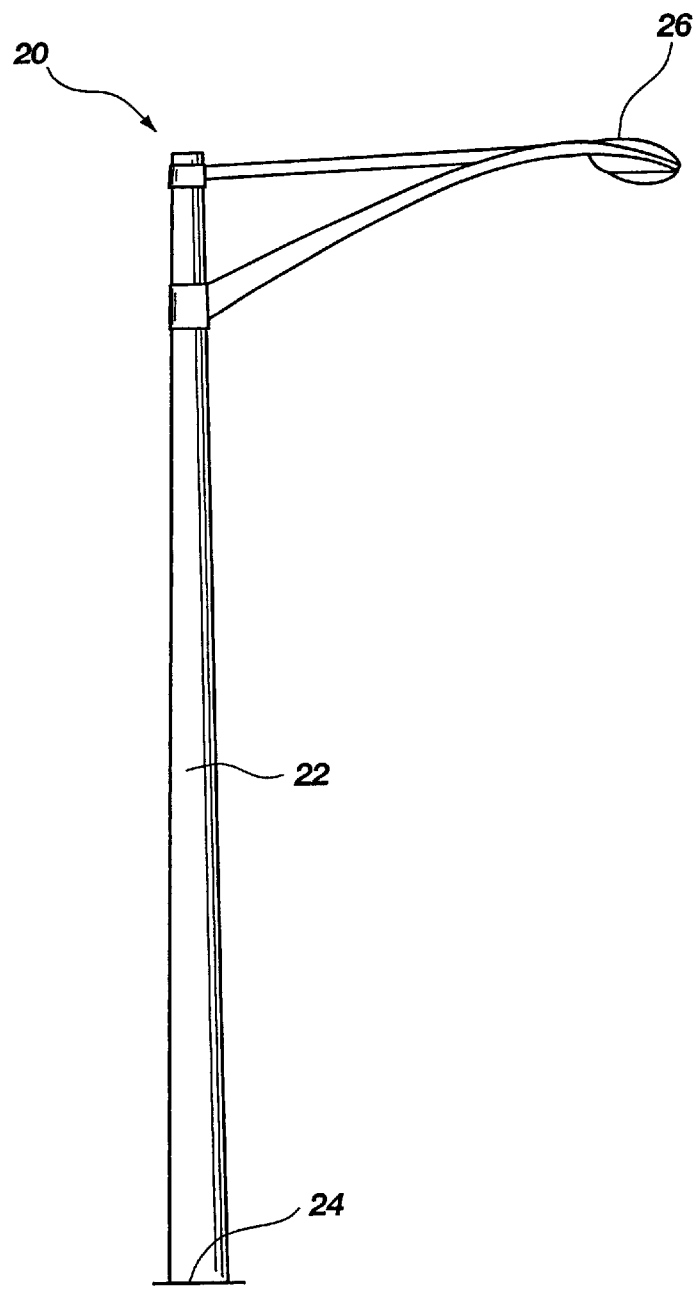
FIG. 2 is a side, elevational view of a street light made in accordance with the principles of the present invention.

Referring now to FIGS. 1–2, there is shown a street lamp 10 in FIG. 1, and a street light 20 in FIG. 2. The street lamp 10 comprises a light pole 12, and the street light 20 comprises a longer light pole 22, both made in accordance with the principles of the present invention. The light 12 of FIG. 1 and the light pole 22 of FIG. 2 are both constructed in the same manner and include the same performance characteristics, and the discussion below will be made in reference to the light pole 22 but applies equally to light pole 12 as well.

The street light 20 includes a base member 24, which constitutes a means for supporting the light pole 22 in a stationary, upwardly-extending orientation. A lighting means 26 is attached to the upper section of the light pole 22 for projecting light. The light pole 22 includes a central axis and is constructed from a filament-wound composite of fiber-reinforced bonding agent, and has a substantially constant exterior taper as shown. The light pole 22 is a one-piece, unitary, elongate, tubular member constructed of filament-wound composite material.

Figure 5:
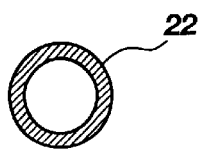
FIG. 5 is a cross-sectional view of the pole of FIGS. 3–4.

Referring now to FIGS. 2 and 5, the light pole 22 has a wall thickness of less than ¾ inch, preferably less than ½ inch thick, and the wall thickness is most preferably ⅜ inch thick. The average outer diameter of the light pole 22 is preferably within a range of four inches and eight inches, and this outer pole diameter is most preferably about six inches.

Figure 3:
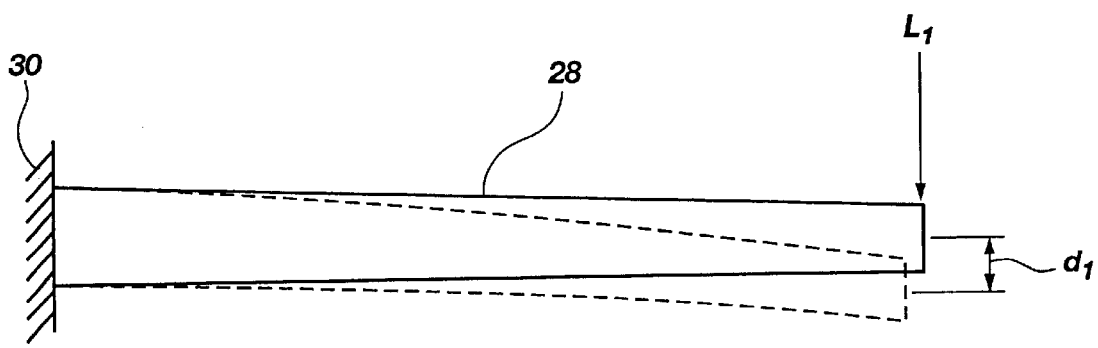
FIG. 3 is a side, schematic view of a section of a tubular pole, made in accordance with the priciples of the present invention, that has been cantilevered and is undergoing a 300-pound load test.

The light pole 22 is a tubular member configured and adapted to support the lighting means 26 thereon without failure of the composite material, such that a twenty-foot section of pole 22 is capable of withstanding a lateral load transverse of the pole's axis of at least 300 pounds without failure of said composite material. This is illustrated in FIG. 3, in which a twenty-foot section 28 of the pole 22 of FIG. 2 is cantilevered at the left end as shown at 30 and a testing load $L_1$ is applied.

When the testing load $L_1$ is 300 pounds, the ANSI standards require that the lateral deflection $d_1$ be no greater than 19.938 inches. Because of the manner in which the light pole 22 is constructed, as mentioned above, some of applicant's test poles at twenty-foot lengths experienced as little as 11⅛ inches of deflection under a 300-pound load $L_1$ in the test illustrated schematically in FIG. 3. In any case, the invention includes a filament-wound composite pole 22 which, when tested in the form of a twenty-foot length in the manner shown schematically in FIG. 3, experiences less than 19.938 inches of deflection $d_1$, more preferably less than 15 inches of deflections, more preferably less than 13 inches, and most preferably less than 12 inches.

Figure 4:
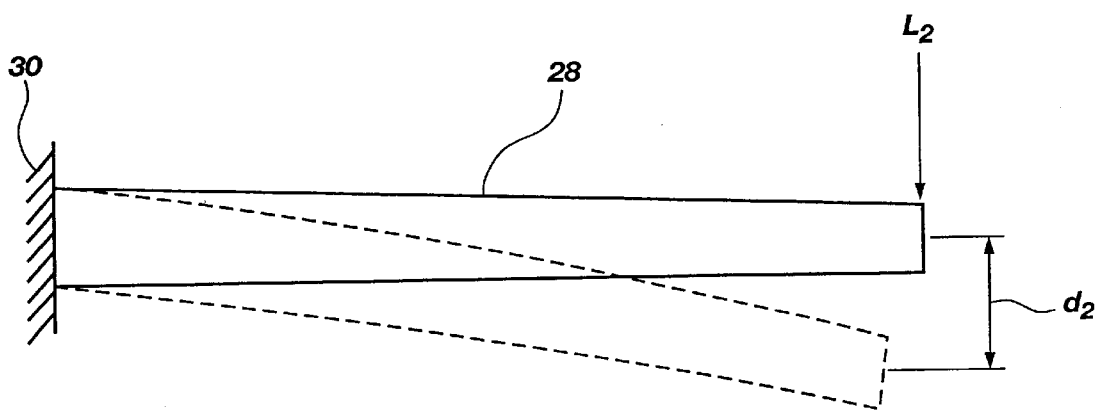
FIG. 4 is a side, schematic view of a the pole of FIG. 3, in the process of a failure strength test.

FIG. 4 illustrates schematically the testing procedure at failure of the composite material. The light pole 22, as constructed in the manner described above, is so strong that some twenty-foot test sections 28 did not fail until the testing load $L_2$ reached 650 pounds in one test, and 700 pounds in another. The invention contemplates the load $L_2$ at failure of the composite material to be at least 400 pounds, more preferably at least 500 pounds, and could be 550 pounds, 600 pounds, 650 pounds, 700 pounds, or any level in between any of those magnitudes. The deflection $d_2$ at failure is less than thirty-six inches, more preferably less than thirty inches, more preferably less than twenty-eight inches, and in one test was 27.5 inches.

The performance characteristics mentioned above render the light pole 22 configured and adapted to bear flexure stress imposed by a lighting member such as the lighting means 26, when said lighting member is attached to the pole 22 and extends outward from the pole 22 in a sideways direction. The mechanical stress induced by the lighting means 26 and any other applicable factor is withstandable by the lighting pole 22 when said pole 22 is constructed in the manner described above.

Further, the lighting pole 22 is light weight, having an average linear weight distribution of less than five pounds per foot and further having an average outer diameter of at least six inches. The lighting pole 22, as shown most clearly in FIG. 5, is preferably characterized by an absence of core material disposed therein for the purpose of providing structural reinforcement to said tubular member. The structure of the filament-wound composite walls themselves, as constructed in the manner described above, provides sufficient strength and so no additional, reinforcing core material is needed, although core material could certainly be used if desired.

Figure 6:
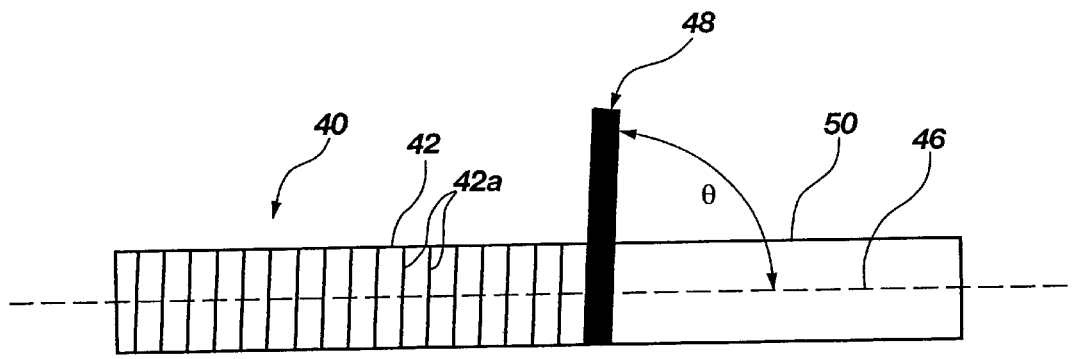
FIG. 6 is a side, schematic view of a tubular member being constructed in accordance with the principles of the present invention.
Figure 7:
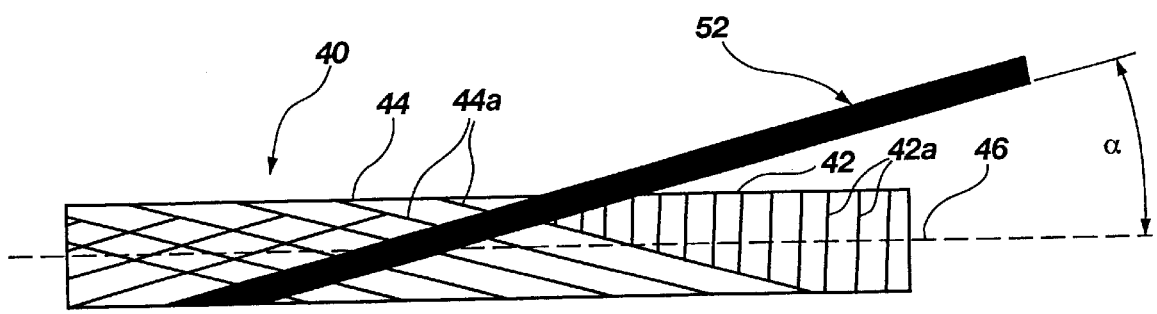
FIG. 7 is a side, schematic view of the tubular member of FIG. 6, in which an internal, helical-wound layer of said tubular member is being constructed.

Referring now to FIGS. 6–7, there is shown some of the key steps involved in constructing a tubular member 40, which eventually becomes the pole 12 (FIG. 1) or 22 (FIG. 2). The tubular member 40 is constructed of multiple, filament-wound layers, including an inner, circumferential hoop-wound layer 42, and at least one internal, helical-wound layer 44, and an external, circumferential hoop-wound layer (not shown in the drawings, but constructed in the substantially the same manner as the inner layer 42 and has substantially the same appearance).

The inner, circumferential hoop-wound layer 42 comprises windings 42a that form an angle θ within a preferable range of 80–100 degrees with respect to the central axis 46 of the tubular member 40. The angle θ is more preferably within a range of 85–90 degrees. Upon the inner layer 42 is wound at least one internal, helical-wound layer 44 comprising windings 44a that form an angle α within a range of 10–20 degrees with respect to the central axis 46 of the tubular member 40. The angle α is more preferably approximately 15 degrees.

Some of the above is relevant to the subject matter disclosed in applicant's prior U.S. Pat. Nos. 5,555,696 and 5,692,351, as well as co-pending application Ser. No. 08/969,117, filed Nov. 12, 1997, entitled "Filament Wound Tubular Column," all of which are incorporated herein by reference in their entireties.

In accordance with the above and in further reference to FIGS. 6–7, a preferred method of constructing a structural lighting pole comprises the steps of:
(a) winding a multiple-tow bundle 48 of fibers about a mandrel 50 and maintaining said fibers under tension within a range of 30–100 pounds, to thereby form an inner, circumferential hoop-wound layer 42 defining a central axis 46, such that said layer 42 is formed of windings 42a that form an angle within a range of 80–100 degrees with respect to said central axis 46;
(b) winding a multiple-tow bundle 52 of fibers about the inner, circumferential layer 42 and maintaining said fibers under tension within a range of 30–100 pounds, to thereby form at least one internal, helical-wound layer 44, such that said internal, helical-wound layer 44 is formed of windings 44a that form an angle within a range of 10–20 degrees with respect to the central axis 46;

(c) winding a multiple-tow bundle of fibers about the at least one internal, helical-wound layer 44 to thereby form an external, circumferential hoop-wound layer (not shown in the drawings but appears similar to the inner layer 42), such that said external, circumferential hoop-wound layer is formed of windings that form an angle within a range of 80–100 degrees with respect to the central axis 46;

(d) undertaking steps (a)–(c) above in a manner sufficient to form a filament-wound composite tubular member of fiber-reinforced bonding agent having a wall thickness of less than ¾ inch, wherein said tubular member is configured and adapted to support a lighting structure thereon without failure of the composite material;

(e) supporting the tubular member in a stationary, upwardly-extending orientation such that said tubular member terminates in an upper section; and (f) attaching lighting means to the upper section of the tubular member for projecting light.

Applicant notes that the magnitude of the stiffness and strength of the pole 12 or 22 constructed in accordance with the above method is a function of how thick the internal helical-wound layer or layers 44 are. The thickness of the helical layer or layers 44 should be generally proportional to the length of the column being constructed, in order to achieve the desired stiffness and strength. Even a relatively small increase in length, a five foot increase for example, would also preferably have a corresponding increase in the thickness of the internal helical layer or layers.

The thickness of the helical layer or layers 44 can be accomplished by either increasing the number of helical layers, or by increasing the thickness of the layers, or both. For example, a twenty foot column might have only a single internal, helical layer 44, while a thirty-five foot column might have two internal, helical layers. The thickness of the helical layers is also a function of the thickness of the fibers and how close together the fibers are maintained, i.e., when the fibers are held closer and tighter together in the bundle, the bundle becomes narrower and thicker, which results causes the resulting layer to be thicker.

In accordance with the features and combinations described above, a preferred method of constructing a lighting pole includes the steps of:

(a) filament-winding a one-piece, unitary, hollow, elongate tubular member and finishing said tubular member to have an external taper and a wall thickness of less than ¾ inch; and (b) testing the tubular member by selecting a twenty-foot section thereof, cantilevering said twenty-foot section at one end and applying a transverse load at an opposing end of 300 pounds, and measuring the deflection of said opposing end.

Step (b) above could be replaced with the following: testing the tubular member by selecting a twenty-foot section thereof, cantilevering said twenty-foot section at one end and applying a variable transverse load at an opposing end and increasing said load until the composite material fails, and measuring the magnitude of said load at failure.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been shown in the drawings and fully described above with particularity and detail in connection with what is presently deemed to be the most practical and preferred embodiment(s) of the invention, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A structural lighting pole comprising:
   a one-piece, unitary, elongate, tubular member defining a central axis, said tubular member being constructed from a filament-wound composite of fiber-reinforced bonding agent and having a wall thickness of less than ¾ inch, wherein said tubular member is configured and adapted to support a lighting structure thereon without failure of the composite material, such that a twenty-foot section of said tubular member fixed at one end is capable of withstanding a lateral load transverse of the axis of at least 300 pounds applied to an opposing free end without failure of said composite material;
   wherein the tubular member is constructed of mutiple, filament-wound layers, including an inner, circumferential hoop-wound layer, and at least one internal, helical-wound layer, and an external, circumferential, hoop-wound layer; and
   wherein the inner, circumferential hoop-wound layer comprises windings that form an angle within a range of 80–100 degrees with respect to the central axis of the tubular member.

2. The lighting pole of claim 1, wherein the tubular member has a wall thickness of less than ½ inch.

3. The lighting pole of claim 1, wherein the tubular member is configured and adapted to bear flexure stress imposed by a lighting member when said lighting member is attached to said tubular member and extends outward from said tubular member in a sideways direction.

4. The lighting pole of claim 1, further comprising:
   means for supporting the tubular member in a stationary, upwardly-extending orientation such that said tubular member terminates in an upper section; and
   lighting means attached to the upper section of the tubular member for projecting light.

5. The lighting pole of claim 1, wherein the tubular member is configured and adapted such that a twenty-foot section of said tubular member fixed at one end undergoes less than 19.938 inches of deflection when a lateral load of at least 300 pounds is applied at an opposing end section of said tubular member in a transverse direction relative to the axis.

6. The lighting pole of claim 1, wherein the tubular member is configured and adapted such that a twenty-foot section of said tubular member fixed at one end undergoes less than 36 inches of deflection when a lateral load is applied at an opposing end section of said tubular member in a transverse direction relative to the axis and at a magnitude sufficient to induce failure of the composite.

7. The lighting pole of claim 1, wherein the tubular member is configured and adapted to support a heavy lighting structure thereon and to bear lateral loads imposed by said lighting structure without failure of the composite, and wherein said tubular member is light weight having an average linear weight distribution of less than five pounds per foot and further having an average outer diameter of at least six inches.

8. The lighting pole of claim 1, wherein the tubular member is characterized by a substantial absence of core material disposed therein for the purpose of providing structural reinforcement to said tubular member.

9. The lighting pole of claim 1, wherein the angle formed by the windings of the inner, circumferential hoop-wound layer is within a range of 85–90 degrees.

10. The lighting pole of claim 1, wherein the at least one internal, helical-wound layer comprises windings that form an angle within a range of 10–20 degrees with respect to the central axis of the tubular member.

11. The lighting pole of claim 10, wherein the angle formed by the windings of the at least one internal, helical-wound layer is approximately 15 degrees.

12. A street light comprising:
    a one-piece unitary, elongate, tubular member defining a central axis, said tubular member being constructed from a filament-wound composite of fiber-reinforced bonding agent and having a substantially constant exterior taper;
    means for supporting the tubular member in a stationary, upwardly-extending orientation such that said tubular member terminates in an upper section; and
    lighting means attached to the upper section of the tubular member for projecting light;
    wherein the tubular member has a wall thickness of less than ¾ inch, said tubular member being configured and adapted to support a lighting structure thereon without failure of the composite material, such that a twenty-foot section of said tubular member is capable of withstanding a lateral load transverse of the axis of at least 300 pounds without failure of said composite material;
    wherein the tubular member is configured and adapted to bear flexure stress imposed by a lighting member when said lighting member is attached to said tubular member and extends outward from said tubular member in a sideways direction;
    wherein the tubular member is configured and adapted such that a twenty-foot section of said tubular member fixed at one end undergoes less than 19.938 inches of deflection when a lateral load of at least 300 pounds is applied at an opposing end section of said tubular member in a transverse direction relative to the axis;
    wherein the tubular member is configured and adapted such that a twenty-foot section of said tubular member fixed at one end undergoes less than 36 inches of deflection when a lateral load is applied at an opposing end section of said tubular member in a transverse direction relative to the axis and at a magnitude sufficient to induce failure of the composite;
    wherein the tubular member is light weight having an average linear weight distribution of less than five pounds per foot and further having an average outer diameter of at least six inches;
    wherein the tubular member is characterized by a substantial absence of core material disposed therein for the purpose of providing structural reinforcement to said tubular member;
    wherein the tubular member is constructed of multiple, filament-wound layers, including an inner, circumferential hoop-wound layer, and at least one internal, helical-wound layer, and an external, circumferential hoop-wound layer; wherein the inner, circumferential hoop-wound layer comprises windings that form an angle within a range of 80–100 degrees with respect to the central axis of the tubular member;
    wherein the at least one internal, helical-wound layer comprises windings that form an angle within a range of 10–20 degrees with respect to the central axis of the tubular member.

13. A structural lighting pole comprising:
    a one-piece, unitary, elongate, tubular member defining a central axis, said tubular member being constructed from a filament-wound composite of fiber-reinforced bonding agent and having a wall thickness of less than ¾ inch, wherein said tubular member is configured and adapted to support a lighting structure thereon without failure of the composite material, and wherein said tubular member is constructed of multiple, filament-wound layers, including an inner, circumferential hoop-wound layer, and at least one internal, helical-wound layer, and an external, circumferential hoop-wound layer, wherein the number of said multiple filament-wound layers remains constant throughout the length of the tubular member.

14. The lighting pole of claim 13, wherein the inner, circumferential hoop-wound layer comprises windings that form an angle within a range of 80–100 degrees with respect to the central axis of the tubular member.

15. The lighting pole of claim 14, wherein the angle formed by the windings of the inner, circumferential hoop-wound layer is within a range of 85–90 degrees.

16. The lighting pole of claim 13, wherein the at least one internal, helical-wound layer comprises windings that form an angle within a range of 10–20 degrees with respect to the central axis of the tubular member.

17. The lighting pole of claim 16, wherein the angle formed by the windings of the at least one internal, helical-wound layer is approximately 15 degrees.

18. A method of constructing a structural lighting pole, said method comprising the steps of:
    (a) winding a multiple-tow bundle of fibers about a mandrel and maintaining said fibers under tension within a range of 30–100 pounds, to thereby form an inner, circumferential hoop-wound layer defining a central axis, such that said layer is formed of windings that form an angle within a range of 80–100 degrees with respect to said central axis;
    (b) winding a multiple-tow bundle of fibers about the inner, circumferential layer and maintaining said fibers under tension within a range of 30–100 pounds to thereby form at least one internal, helical-wound layer, such that said internal, helical-wound layer is formed of windings that form an angle within a range of 10–20 degrees with respect to the central axis;
    (c) winding a multiple-tow bundle of fibers about the at least one internal, helical-wound layer to thereby form an external, circumferential hoop-wound layer, such that said external, circumferential hoop-wound layer is formed of windings that form an angle within a range of 80–100 degrees with respect to the central axis;
    (d) undertaking steps (a)–(c) above in a manner sufficient to form a filament-wound composite tubular member of fiber-reinforced bonding agent having a wall thickness of less than ¾ inch, wherein said tubular member is configured and adapted to support a lighting structure thereon without failure of the composite material;
    (e) supporting the tubular member in a stationary, upwardly-extending orientation such that said tubular member terminates in an upper section; and
    (f) attaching lighting means to the upper section of the tubular member for projecting light.

19. The method of claim 18, wherein a twenty-foot section of the tubular member is capable of withstanding a lateral load transverse of the central axis of at least 300 pounds without failure of the composite material.

20. The method of claim 18, wherein step (b) further comprises making the internal, helical-wound layer thicker by either maintaining the fibers closer together during winding or by making more than one internal, helical-wound layer.

* * * * *